United States Patent
Akada et al.

(10) Patent No.: US 6,628,389 B1
(45) Date of Patent: Sep. 30, 2003

(54) METHOD AND APPARATUS FOR MEASURING CELL GAP OF VA LIQUID CRYSTAL PANEL

(75) Inventors: Tomohiro Akada, Moriyama (JP); Kenji Murano, Hirakata (JP); Koichi Kuraue, Shiga (JP)

(73) Assignee: Otsuka Electronics Co., Ltd., Osaka (JP)

(*) Notice: Subject to any disclaimer, the term of this patent is extended or adjusted under 35 U.S.C. 154(b) by 0 days.

(21) Appl. No.: 09/831,420

(22) PCT Filed: Sep. 20, 1999

(86) PCT No.: PCT/JP99/05160
§ 371 (c)(1),
(2), (4) Date: May 9, 2001

(87) PCT Pub. No.: WO01/22029
PCT Pub. Date: Mar. 29, 2001

(51) Int. Cl.[7] .............................. G01J 4/00; G01B 11/28
(52) U.S. Cl. ........................................ 356/364; 356/630
(58) Field of Search .................................. 356/630, 365, 356/364, 128; 349/187

(56) References Cited

U.S. PATENT DOCUMENTS

| | | | |
|---|---|---|---|
| 5,504,581 A | 4/1996 | Nagata et al. | 356/364 |
| 5,734,472 A | 3/1998 | Ito et al. | 356/364 |
| 5,903,352 A * | 5/1999 | Ohsaki et al. | 356/364 |
| 5,966,195 A * | 10/1999 | Sato et al. | 349/187 |
| 6,064,462 A * | 5/2000 | Takeuchi et al. | 349/192 |
| 6,081,337 A * | 6/2000 | Kwok et al. | 356/601 |
| 6,300,929 B1 * | 10/2001 | Hisatake et al. | 702/28 |
| 6,300,954 B1 * | 10/2001 | Sato et al. | 356/364 |
| 6,348,966 B1 * | 2/2002 | Hirosawa | 356/364 |

FOREIGN PATENT DOCUMENTS

| | | | |
|---|---|---|---|
| JP | 02-118406 | 5/1990 | |
| JP | 04198841 A * | 7/1992 | G01N/21/21 |
| JP | 04-307312 | 10/1992 | |

OTHER PUBLICATIONS

"Optical properties of general twisted nematic liquid–crystal displays," Hiap Liew Ong, Appl. Phys. Lett. 51 (18), Nov. 2, 1987, pps. 1398–1400.

* cited by examiner

Primary Examiner—Zandra V. Smith
Assistant Examiner—Gordon J. Stock, Jr.
(74) Attorney, Agent, or Firm—Finnegan, Henderson, Farabow, Garrett & Dunner LLP

(57) ABSTRACT

Light is directed to a VA (Vertical Alignment) liquid crystal panel whose optical axis is in a direction perpendicular to the panel surface in such a manner that the light is incident obliquely on the VA liquid crystal panel surface, by which birefringence that results only from the liquid crystal layer is artificially generated so that measurement of the thickness (cell gap) of the VA liquid crystal is accurately performed.

7 Claims, 9 Drawing Sheets

FIG. 9

$\lambda = 589$nm

| $\theta$ | 45° | 40° | 35° | 30° | 25° |
|---|---|---|---|---|---|
| R (nm) | 65.99 | 53.06 | 41.54 | 30.70 | 21.67 |
| d₀ ($\mu$m) | 3.519 | 3.493 | 3.512 | 3.485 | 3.488 |

METHOD AND APPARATUS FOR MEASURING CELL GAP OF VA LIQUID CRYSTAL PANEL

BACKGROUND OF THE INVENTION

1. Field of the Invention

The present invention relates to a method and a device for measuring the thickness of a vertically aligned liquid crystal (hereinafter referred to as "VA liquid crystal") being sealed in a panel.

2. Description of Related Art

Liquid crystal display panels comprise glass layers at their top and bottom with the intermediate layer being filled with a liquid crystal. The portion to be filled with the liquid crystal is previously filled with air until the liquid crystal is sealed therein.

There has been a conventional method of measuring the thickness (cell gap) of a liquid crystal sealed in a panel, in which light is directed from above the panel without the liquid crystal sealed therein so that reflection interference of the light is measured to obtain a thickness of the air layer, which is regarded as the thickness of the liquid crystal (Reflection-interference method).

However, the thickness of the air layer and that of the liquid crystal after being sealed in are not identical in a strict sense. Accordingly, developing a method for directly measuring the thickness of a liquid crystal after it is sealed in has been awaited.

Another known method is a method in which the birefringence property of uniaxial crystals that liquid crystals have is utilized in such a manner that light is directed through a polarizer perpendicularly to the surface of a liquid crystal panel with a liquid crystal sealed therein so as to measure an optical transmittance. Based on the optical transmittance, a birefringent phase shift (which is called "retardation") of the liquid crystal is determined, from which the cell gap is obtained. (Refer to H. L. Ong, Appl. Phys. Lett. 51 (18), Nov. 2, 1987, pp1398–1400, Japanese Unexamined Patent Publication Nos. H4-307312 and H2-118406.)

Although the above-mentioned method is an excellent measuring method utilizing the birefringence property of liquid crystals, it is only effective for liquid crystals whose crystal axis is in a direction parallel to the panel surface, and inapplicable to liquid crystals including the VA liquid crystal whose crystal axis is in a direction perpendicular to the panel surface. This is because, as far as uniaxial crystals are concerned, the "liquid crystal whose crystal axis is in a direction perpendicular to the panel surface" is not different from an isotropic liquid crystal when viewed from the light traveling direction.

Although the reflection-interference method mentioned above may be employed for the isotropic liquid crystal, due to proximity of the refractive index of liquid crystal to that of glass, only weak interfering light is expected to generate, which causes a great margin of error in the measured film thickness.

It is therefore an object of the present invention to provide a method and device for accurately measuring the thickness (cell gap ) of a VA liquid crystal having a birefringence property whose optical axis is in a direction perpendicular to the surface of the liquid crystal panel.

SUMMARY OF THE INVENTION

The method of measuring a cell gap of a VA liquid crystal according to this invention comprises the steps of: extracting a fixed polarized component from light of a light source; directing the light of the polarized component to the liquid crystal panel such that the light is incident obliquely on an optical axis of the VA liquid crystal panel; measuring transmittance intensity of a specific, polarized component of the light that has passed through the VA liquid crystal panel; determining a retardation R of the VA liquid crystal based on the transmittance intensity; and obtaining a thickness of the VA liquid crystal by means of the retardation R and data of an ordinary refractive index no and an extraordinary refractive index ne of the VA liquid crystal.

The "light of the light source" mentioned above may be a monochromatic light or a polychromatic light (e.g. white light). In the case of a monochromatic light, the measurement of the transmittance intensity can be carried out directly by a light receiving element. On the other hand, in the case of a polychromatic light, the measurement of the transmittance intensity is carried out by the light receiving element via a spectroscope.

In this method, by directing the light such that the light is incident obliquely on the optical axis of the liquid crystal panel, birefringence caused only by the liquid crystal layer is artificially generated. Accordingly, the thickness of the VA liquid crystal can be accurately measured.

The device for measuring a cell gap of a VA liquid crystal according to this invention comprises: a light source; a polarizer for extracting a fixed, polarized component from the light of the light source; optical axis setting means capable of directing the light of the polarizer to the VA liquid crystal panel such that the light is incident obliquely on an optical axis of the VA liquid crystal panel; an analyzer for extracting a specific, polarized component of the light that has passed through the VA liquid crystal panel; a light receiver for measuring transmittance intensity of the analyzer; and data processor for obtaining a retardation R of the VA liquid crystal panel based on the transmittance intensity so as to obtain a thickness of the VA liquid crystal by means of the retardation R and data of an ordinary refractive index no and an extraordinary refractive index ne of the VA liquid crystal.

This device includes optical axis setting means capable of directing the light to the VA liquid crystal panel such that the light is incident obliquely on the optical axis of the VA liquid crystal panel. Directing the light so as to be incident obliquely on the optical axis of the VA liquid crystal allows birefringence that results only from the liquid crystal layer to be artificially generated. Accordingly, the thickness of the VA liquid crystal panel can be measured accurately.

BRIEF DESCRIPTION OF THE DRAWINGS

FIG. 9 is a table showing a result of calculation or obtaining cell gap d0 based on retardation R at wavelength of 589 nm.

DESCRIPTION OF THE PREFERRED EMBODIMENTS

Figure 1:
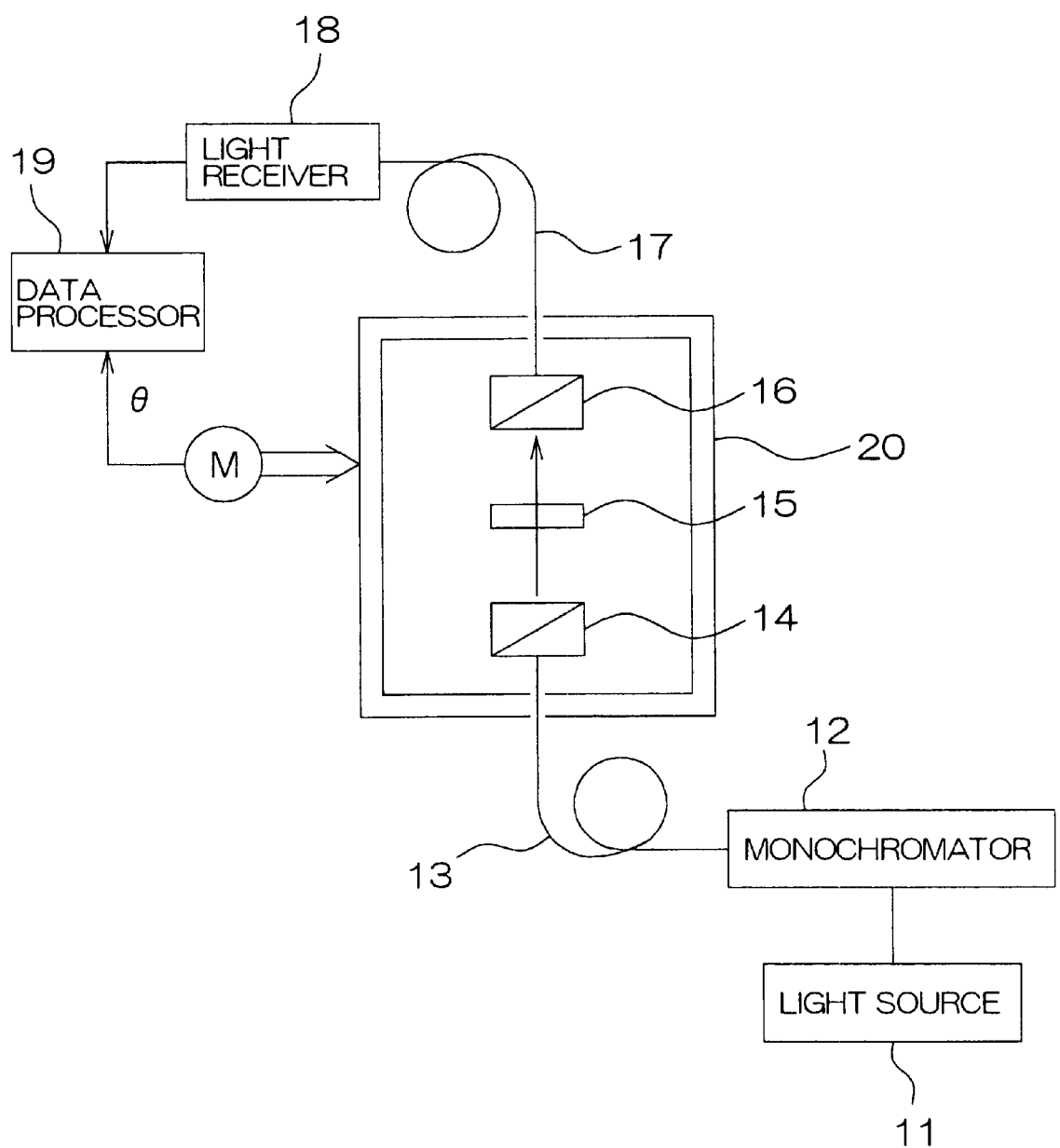
FIG. 1 is a block diagram schematically showing a cell gap measurement device.

FIG. 1 is a block diagram schematically showing a cell gap measurement device.

The measurement device comprises a light source 11 such as a halogen lamp, a monochromator 12 for obtaining a monochromatic light, an incident light fiber 13 for guiding the light emitted from the monochromator 12, a polarizer 14 for extracting a linear polarized light from the light of the incident light fiber 13, a sample VA liquid crystal panel 15, an analyzer 16 for extracting a linear polarized light from the light that has passed through the VA liquid crystal panel 15, an emerging light fiber 17 for guiding the light that has passed through the analyzer 16, a light receiver 18 and a data processor 19.

The incident light fiber 13, the emerging light fiber 17, the polarizer 14 and the analyzer 16 are fixed in a frame 20. The incident angle θ of the light incident on the VA liquid crystal panel 15 can be changed by rotating the frame, for example, by a motor M. Data of the rotation angle of the motor M are to be inputted in the data processor 19.

Meanwhile, in order to change the incident angle θ of the light incident on the VA liquid crystal panel 15, a mechanism in which the frame is fixed while a table for mounting the VA liquid crystal panel thereon is inclinable may also be adopted.

Figure 2:
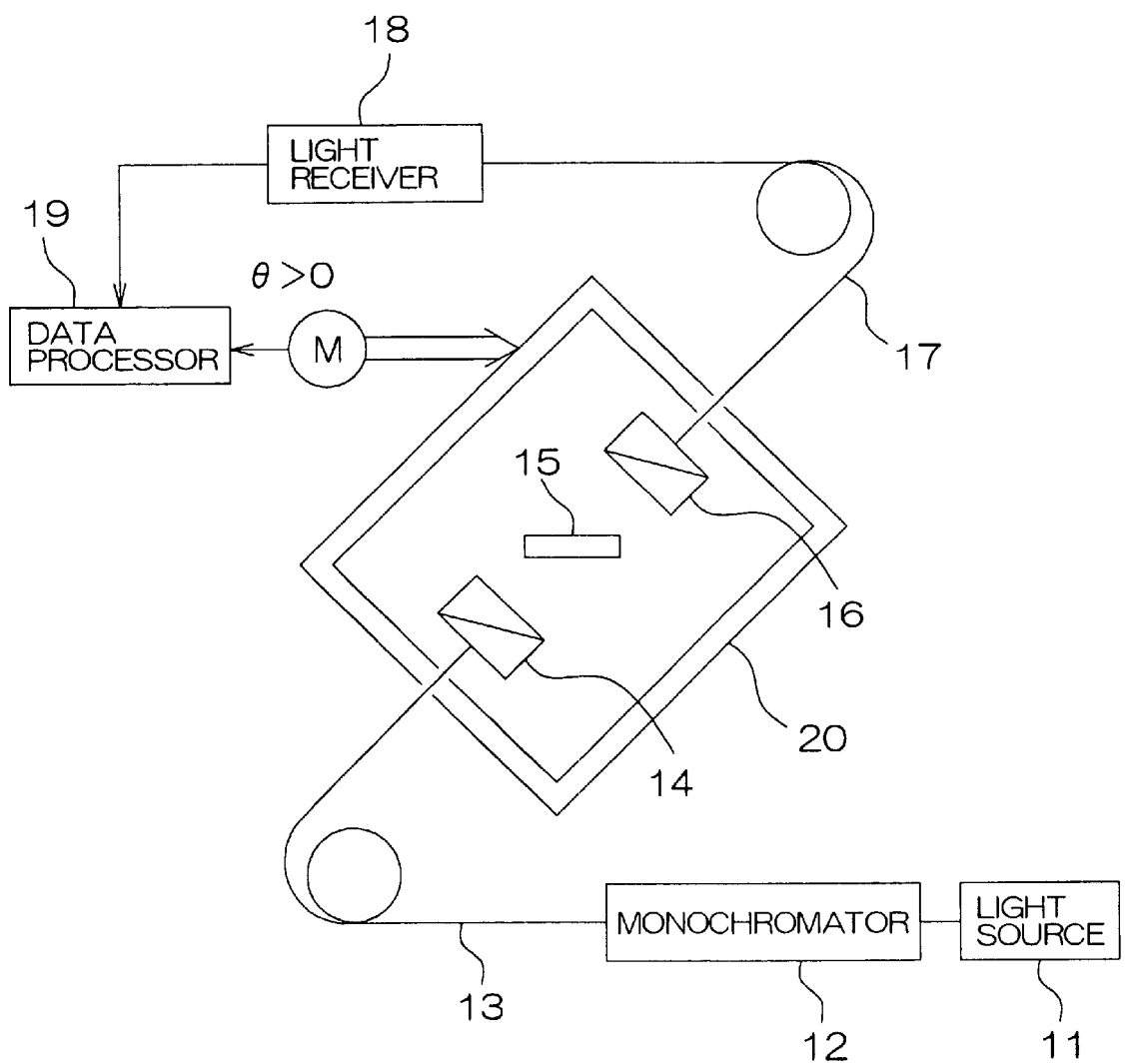
FIG. 2 is a block diagram schematically showing the cell gap measurement device in which the frame is inclined.
Figure 3:
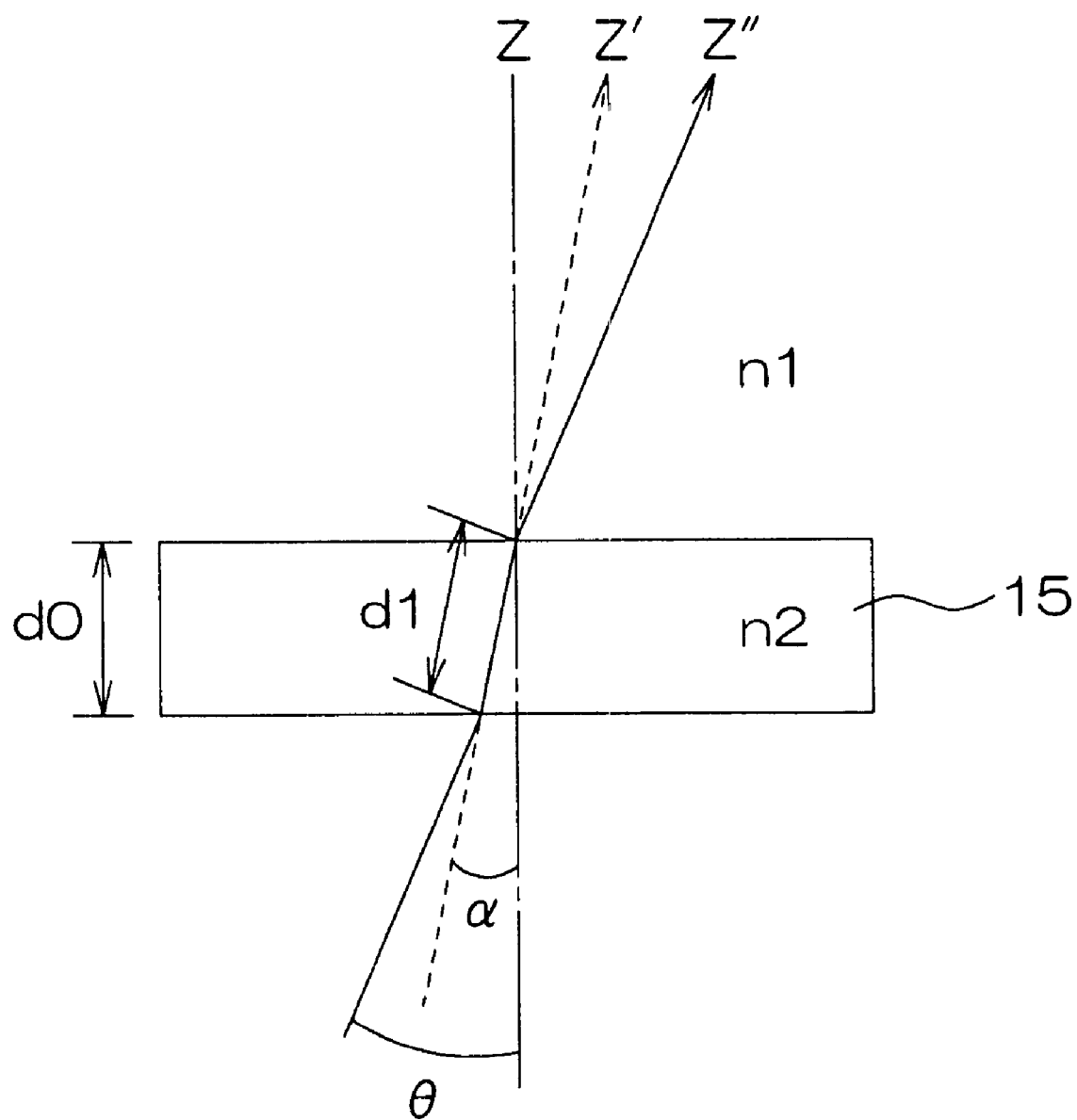
FIG. 3 is an illustration for explaining the relation between an angle θ of light incident on a VA liquid crystal and an angle α of the light passing through the VA liquid crystal.

FIG. 2 is a block diagram schematically showing the cell gap measurement device in which the frame 20 is inclined by an angle of θ. In this condition, the angle of the light incident on the VA liquid crystal panel 15 is θ as shown in FIG. 3, and the tilt of the light passing through the VA liquid crystal panel 15 is α due to refraction. When the refractive index outside the VA liquid crystal is defined as n1 (n1 equals to 1 because usually the outside of the VA liquid crystal is air) and the refractive index of the VA liquid crystal is defined as n2, the relation between θ and α is represented by the following equation:

$$n2 \sin \alpha = n1 \sin \theta \quad \text{(Snell's law)} \tag{1}$$

Here, the refractive index n2 of the VA liquid crystal cannot be determined as a unique value because of the birefringence of the VA liquid crystal. Accordingly, an average value taken from an extraordinary index ne and an ordinary index no is used, which is given by $$n2 = (ne + no)/2 \tag{2}$$

In addition, the optical path length inside the VA liquid crystal is d1 as shown in FIG. 3. The relation between d1 and the thickness of the VA liquid crystal (cell gap) d0 is represented by:

$$d1 \cos \alpha = d0 \tag{3}$$

Figure 4:
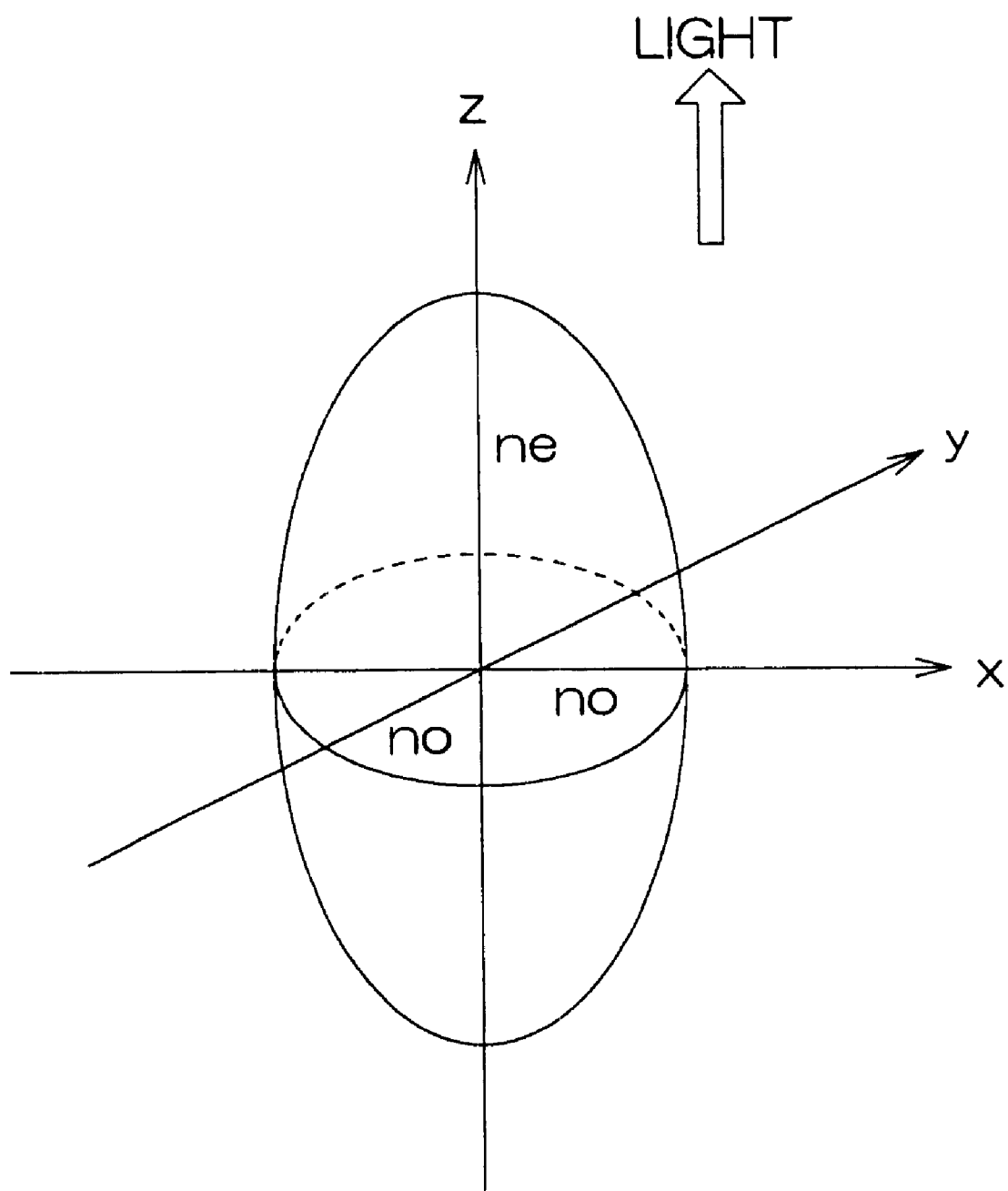
FIG. 4 shows an index ellipsoid of the VA liquid crystal.

FIG. 4 is a perspective view of an index ellipsoid of the VA liquid crystal. The crystal axis of the VA liquid crystal is set along the z-axis of the coordinate system. Since the VA liquid crystal behaves as an isotropic medium to a light beam traveling in the direction of the z-axis, the refractive index is not dependant on the polarization direction of the light.

Figure 5:
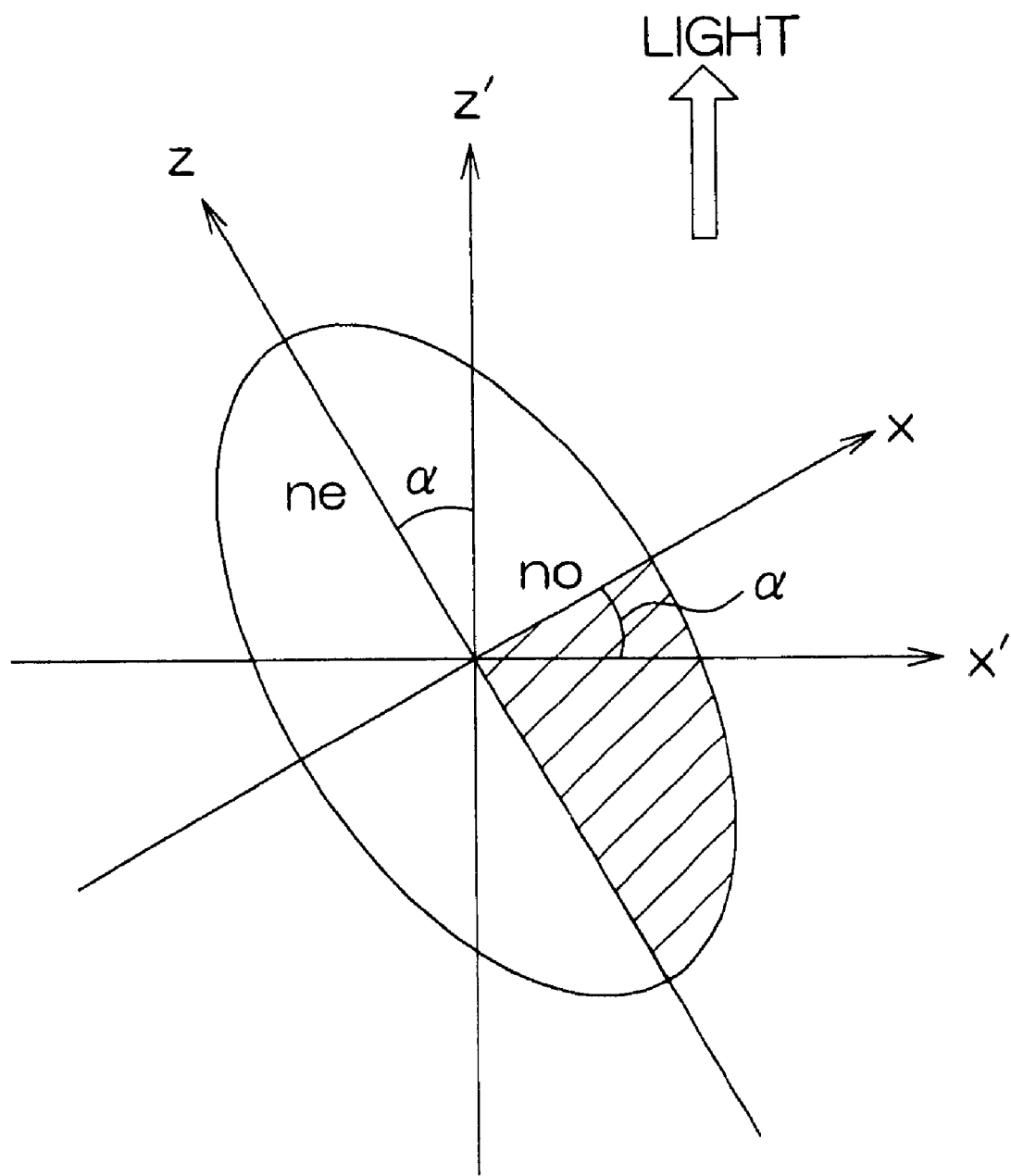
FIG. 5 shows the index ellipsoid when the light is inclined.

FIG. 5 illustrates the index ellipsoid of the VA liquid crystal being tilted by an angle of θ. The z-axis denotes the crystal axis of the VA liquid crystal, and the z-axis denotes the traveling direction of the light. The z-axis and the z-axis form an angle α.

Figure 6:
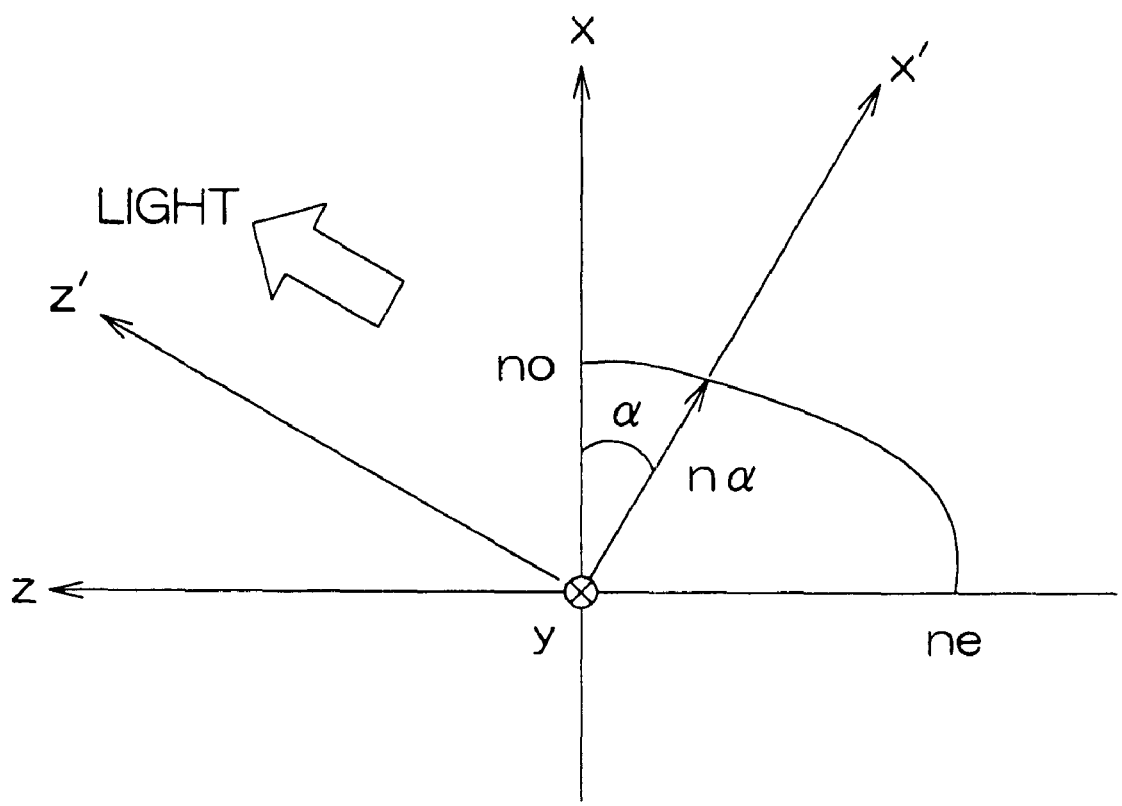
FIG. 6 is a partial view of FIG. 5.

FIG. 6 illustrates a part taken from FIG. 5 in which the part is hatched. A refractive index nα inside the VA liquid crystal of a light beam whose amplitude is in the direction of the x-axis (the light beam is hereinafter referred to as the "extraordinary oblique beam") is obtained from the following equation:

$$n\alpha = [ne^2 no^2 / (ne^2 \cos^2 \alpha + no^2 \sin^2 \alpha)]^{1/2} \tag{4}$$

Meanwhile, the refractive index of a light beam whose amplitude is in the direction of the y-axis (the light beam is hereinafter referred to as the "ordinary beam") is the same as the ordinary index no of the VA liquid crystal.

Accordingly, a difference Δn in refractive index between the ordinary beam and the extraordinary oblique beam is given by the following equation $$\Delta n = ABS(n\alpha - no) \tag{5}$$

where ABS is an absolute value, Δn=0 when α=0, and Δn>0 when α>0.

With ne and no of the VA liquid crystal and an incident angle θ given as data, the data processor 19 finds an angle α of the extraordinary oblique beam that passes through the VA liquid crystal by the equations (1) and (2). Subsequently, it calculates the refractive index nα of the light inside the VA liquid crystal by the equation (4), and the difference Δn in refractive index by the equation (5) above.

With the difference Δn in refractive index having been obtained, a retardation R between the ordinary beam and the extraordinary oblique beam that pass through the VA liquid crystal is experimentally determined and is given to the data processor 19. The data processor 19 then calculates an optical path length d1 inside the VA liquid crystal panel based on the following equation:

$$d1 = R / \Delta n \tag{6}$$

Subsequently, the data processor 19 converts the optical path length d1 inside the VA liquid crystal into a cell gap d0 by means of the equation (3) above. Thus, the cell gap of the VA liquid crystal can be obtained.

It has been understood from the aforementioned explanation that the user of the cell gap measurement device needs to input the data ne and no of the VA liquid crystal in the data processor 19, as well as to find the retardation R between the ordinary beam and the extraordinary oblique beam that pass through the VA liquid crystal when the incident angle θ is tilted. Now, how to obtain the retardation R is discussed.

Figure 7:
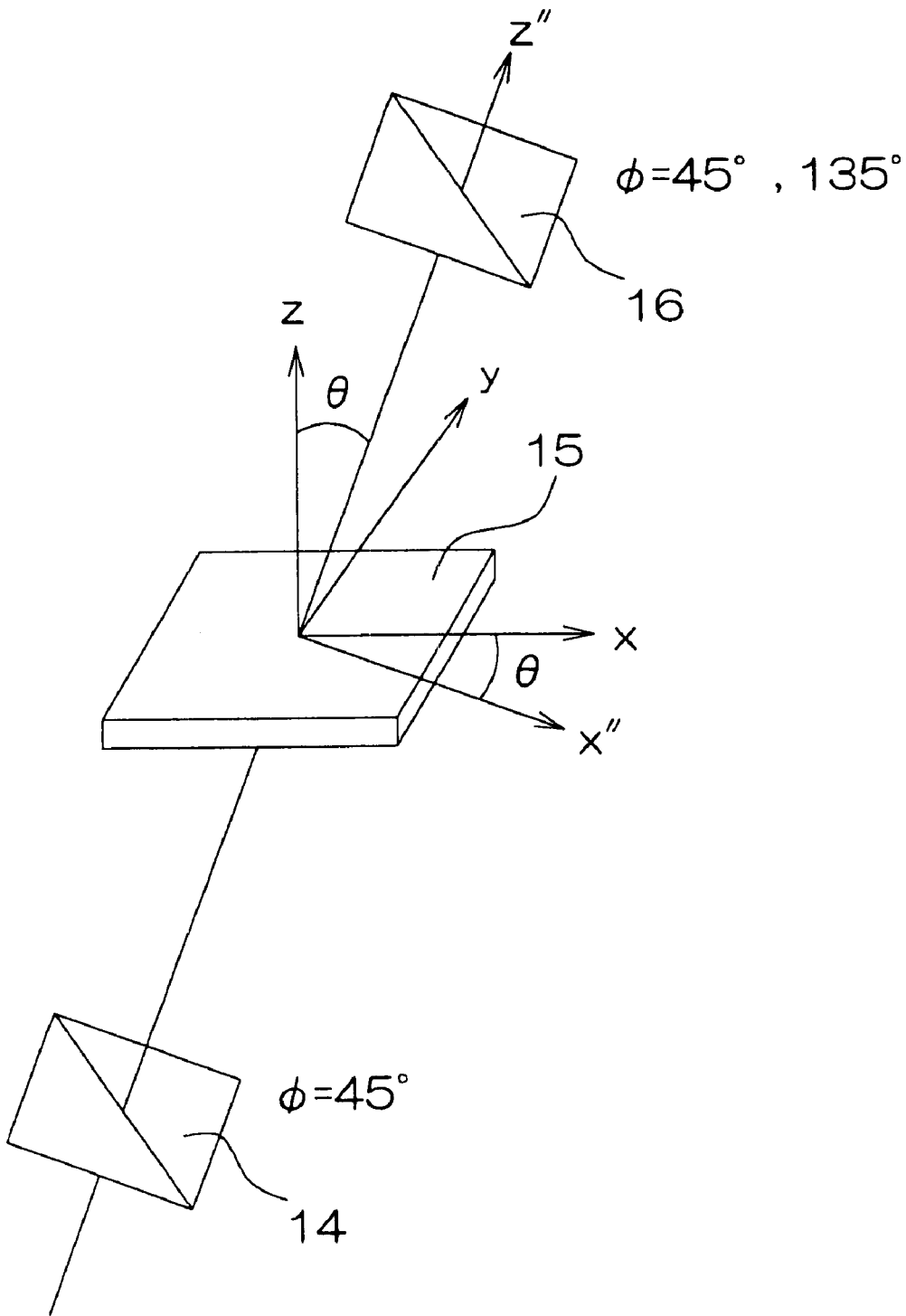
FIG. 7 is a perspective view of an essential portion of an optical system in which the incident angle θ is tilted with respect to the y-axis being the center.

FIG. 7 is a perspective view of an essential portion of an optical system in which the incident angle θ is tilted with respect to the y-axis being the center. The direction of the incident light is shown as the z"-axis, while the x"-axis is set in a direction perpendicular to the y-axis and z"-axis.

The polarization direction of the polarizer 14 is tilted by 45° clockwise with respect to the y-axis within a plane including the y-axis and x"-axis. The polarization direction of the analyzer 16 is tilted by 45° clockwise with respect to y-axis within the plane including y-axis and x"-axis so as to measure a transmittance intensity Tp in a parallel nicol condition. Then, the analyzer 16 is further tilted by 90° (135° in total) so as to measure a transmittance intensity Tc in a cross nicol condition.

In the parallel nicol condition, the transmittance intensity Tp is represented by $$Tp = \cos^2 \beta \quad (7)$$

In the cross nicol condition, the transmittance intensity Tc is represented by $$Tc = \sin^2 \beta \quad (8)$$

Here, with a wavelength at the measurement given as $\lambda$, $\beta$ is defined as $$\beta = \pi R/\lambda \quad (9)$$

This results in the following equation:

$$Tc/Tp = \tan^2 \beta \quad (10)$$

Then, the retardation R is given by $$\pi R = \lambda \tan^{-1} \sqrt{(Tc/Tp)} \quad (11)$$

Incidentally, the present invention is not limited to the above-mentioned embodiment. Instead of the combination of the light source 11 and the monochromator 12 used in the above embodiment, a laser beam source may be used for the monochromatic light source.

In addition, although the transmittance intensity measurement is performed by means of a combination of the light source 11, the monochromator 12, and the light receiver 18 in the above embodiment, it is possible to eliminate the monochromator 12 and to dispose a spectroscope before the light receiver 18. The way of spectroscoping when using a spectroscope may be arbitrarily determined, in which, for example, a color filter, a prism, a grating or the like may be adopted.

Furthermore, instead of using the motor M for inclining the optical axis, the device may be arranged such that the frame or the table for mounting the VA liquid crystal panel thereon can be inclined by hand. Or, the device may be arranged such that the optical axis is preliminarily tilted at a fixed angle.

EXAMPLE

Figure 8:
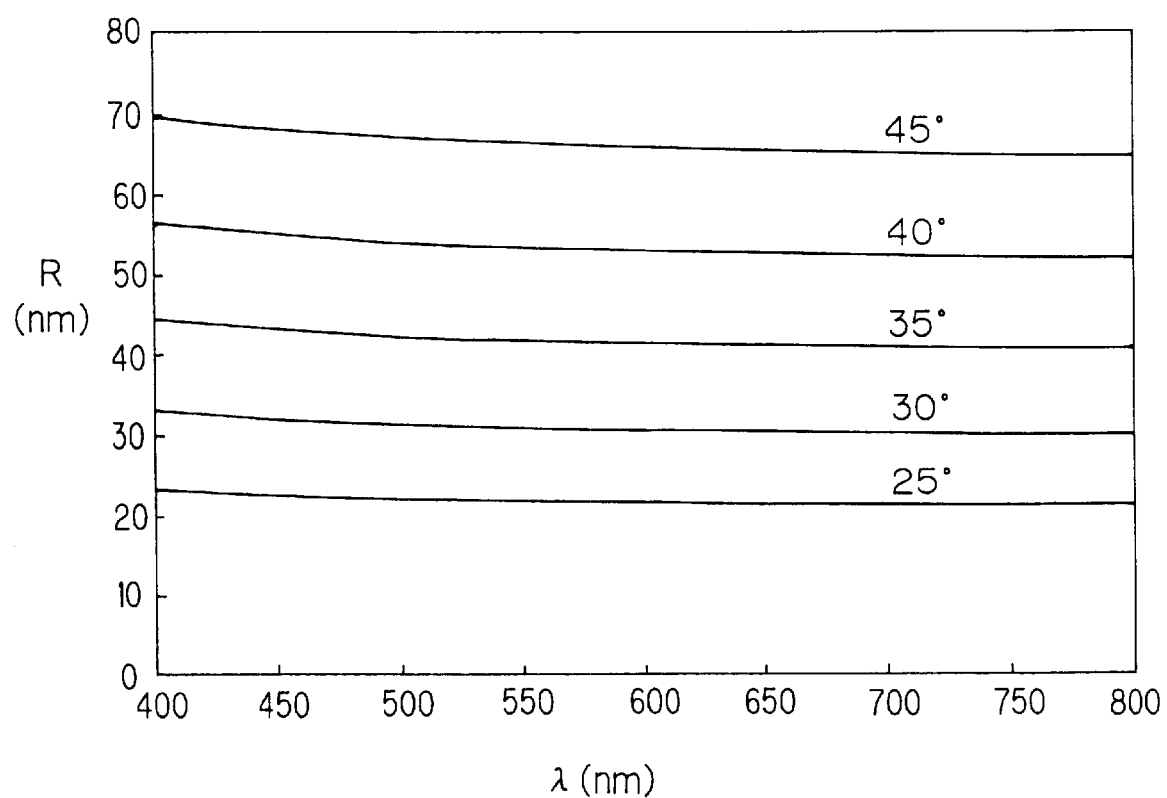
FIG. 8 is a graph showing a relation between tardation R and wavelength λ obtained when the incident angle θ on a VA liquid crystal is gradually varied from 25° to 45°.

With respect to a VA liquid crystal panel (with a cell gap of approximately 3.5 μm, which is estimated from its spacer diameter), the incident angle θ is gradually varied from 25° to 45° in finding a relation between retardation R and wavelength $\lambda$. The obtained result is shown as a graph in FIG. 8.

Retardations R at a wavelength of 589 nm are read out from the graph, and cell gaps d0 are obtained by the calculation according to this invention. The result is shown in the table in FIG. 8.

As FIG. 9 shows, the cell gap d0 slightly fluctuates according to the incident angle θ varying from 25° to 45°. However, the value is almost constantly in the vicinity of 3.5 μm. Since the tendency of the fluctuation is not constant within the range from 25° to 45° of the incident angle, it is possible to assume that effect of the fluctuation can be denied by taking an average.

The results set forth above indicate that the cell gap d0 can be accurately measured irrespective of the value of the incident angle θ by the method of measuring a cell gap of a VA liquid crystal panel according to the present invention.

What is claimed is:

1. A method of measuring a cell gap of a VA liquid crystal panel comprising the steps of:

(1) extracting a fixed, polarized component from light of a light source;

(2) directing the light of the polarized component to a VA liquid crystal panel such that the light is incident obliquely on an optical axis of the VA liquid crystal panel;

(3) measuring transmittance intensity of a specific, polarized component of the light that has passed through the VA liquid crystal panel;

(4) determining a retardation R of the VA liquid crystal panel based on the transmittance intensity; and (5) obtaining a thickness of the VA liquid crystal panel by means of the retardation R and data of an ordinary refractive index no and an extraordinary refractive index ne of the VA liquid crystal panel.

2. The method of measuring a cell gap of a VA liquid crystal panel according to claim 1, wherein the retardation R is obtained by measuring transmittance intensity in a parallel nicol condition and that in a cross nicol condition separately.

3. The method of measuring a cell gap of a VA liquid crystal panel according to claim 1, wherein the thickness of the VA liquid crystal panel is obtained through the steps of:

(a) calculating a refractive index nα of an extraordinary oblique beam within the VA liquid crystal based on an ordinary refractive index no and an extraordinary refractive index ne of the VA liquid crystal panel;

(b) calculating a difference Δn between the refractive index nα and the refractive index no of an ordinary beam within the VA liquid crystal panel;

(c) dividing the retardation R by the difference Δn so as to obtain an optical path length d1 within the VA liquid crystal panel; and (d) converting the optical path length d1 into a cell gap d0 taking refraction of the light at an interface between air and the VA liquid crystal panel into account.

4. A device for measuring a cell gap of a VA liquid crystal panel comprising:

a light source;

(1) a polarizer for extracting a fixed polarized component from light of the light source;

(2) optical axis setting means for directing the light of the polarizer such that the light is incident obliquely on an optical axis of a VA liquid crystal panel;

(3) an analyzer for extracting a specific, polarized component of the light that has passed through the VA liquid crystal panel;

(4) a light receiver for measuring transmittance intensity of the analyzer; and (5) a data processor for determining a retardation R of the VA liquid crystal panel based on the transmittance intensity so as to obtain a thickness of the VA liquid crystal by means of the retardation R and data of an ordinary refractive index no and an extraordinary refractive index ne of the VA liquid crystal panel.

5. The device for measuring a cell gap of a VA liquid crystal panel according to claim 4, wherein the optical axis setting means comprises an inclining mechanism capable of changing an angle between the light of the polarizer and the optical axis of the VA liquid crystal panel.

6. The device for measuring a cell gap of a VA liquid crystal panel according to claim 5, wherein the inclining mechanism changes inclination of the light of the polarizer.

7. The device for measuring a cell gap of a VA liquid crystal panel according to claim 5, wherein the inclining mechanism changes inclination of the optical axis of the VA liquid crystal panel.

* * * * *